No. 796,122. PATENTED AUG. 1, 1905.
C. D. HIGGINS.
MILK PAIL ATTACHMENT.
APPLICATION FILED MAR. 27, 1905.

2 SHEETS—SHEET 1.

Witnesses
Thos. Layard
H. Q. Bowman

Inventor
Charles D. Higgins
By P. H. Gunckel
his Attorney.

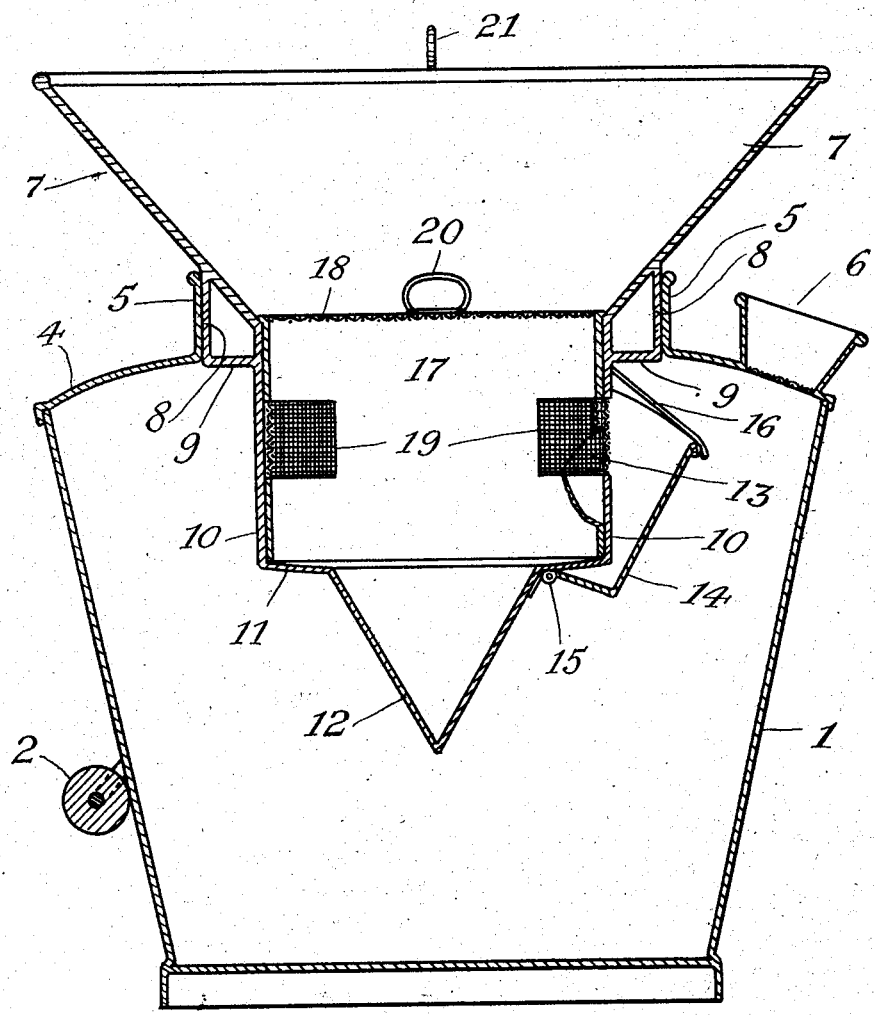

UNITED STATES PATENT OFFICE.

CHARLES D. HIGGINS, OF ABERDEEN, SOUTH DAKOTA.

MILK-PAIL ATTACHMENT.

No. 796,122.     Specification of Letters Patent.     Patented Aug. 1, 1905.

Application filed March 27, 1905. Serial No. 252,139.

*To all whom it may concern:*

Be it known that I, CHARLES D. HIGGINS, a citizen of the United States, residing at Aberdeen, Brown county, and State of South Dakota, have invented certain new and useful Improvements in Milk-Pail Attachments, of which the following is a specification.

My invention relates to devices attached to milk-pails for straining the milk as it flows into the pails; and its principal objects are to simplify the construction of the attachments, to improve the means for straining the milk, and to provide a settling-chamber.

My improvements are illustrated in the accompanying drawings, in which—

Figure 3:
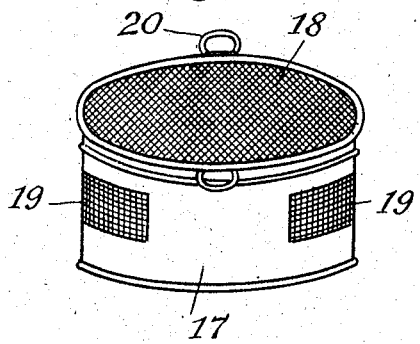
Figure 1:
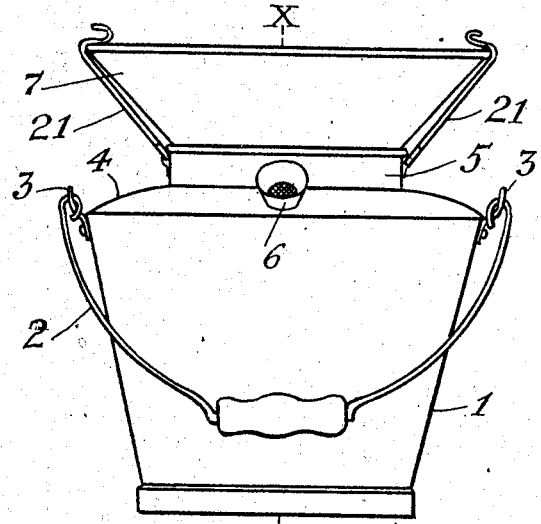
Figure 4:
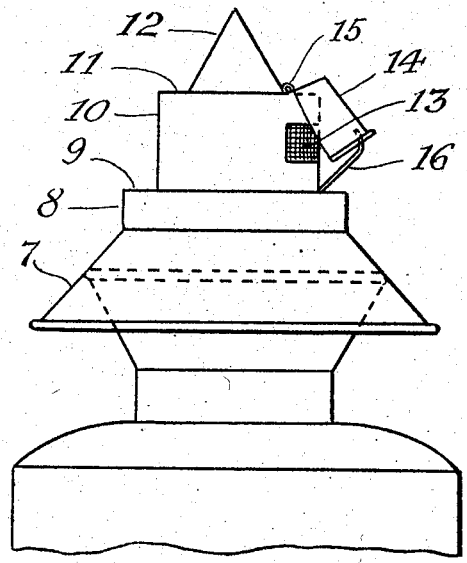
Figure 5:
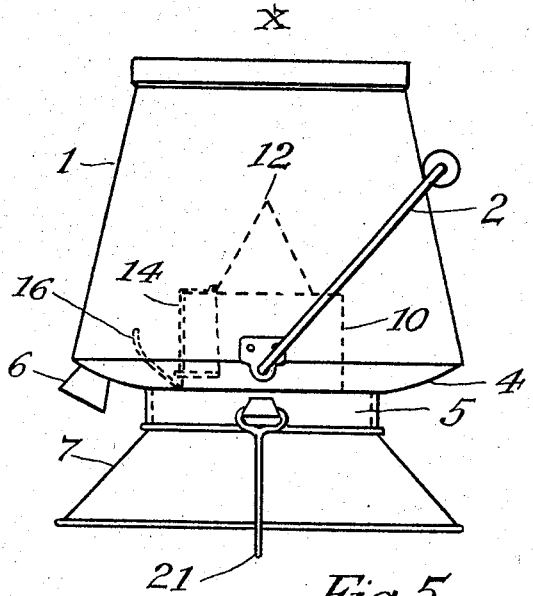

Figure 1 shows a side elevation of a milk-pail provided with my improvements. Fig. 2 shows a sectional elevation of the same on the line $x\,x$ of Fig. 1. Fig. 3 is a perspective view of the removable strainer. Fig. 4 is a side elevation of the upper portion of a milk-pail covered by the attachment in inverted position, and Fig. 5 is a side of an inverted pail with the attachments shown in the position they would then occupy.

In the drawings, 1 designates an ordinary milk-pail having a bail 2 connected to ears 3 in the usual way. The top of the pail is partially inclosed by a cover 4, from which a flange or neck 5 extends upward around the central opening. A discharge spout or outlet 6 is provided in the cover 4.

The attachment consists of a funnel-shaped device, which is adapted to be inserted and removed at pleasure. Adjacent to the flaring upper portion 7 is a cylindrical section or collar 8, that fits snugly in the neck 5, and from the lower end of the collar 8 a horizontal flange 9 extends inward at about the level of the pail-cover 4 when in place. From the inner edge of the flange 9 a relatively long cylindrical portion 10, constituting the body of the funnel, extends downward into the pail and is closed by a bottom 11, the central portion of which extends downward in form of a hollow cone 12, intended to serve as a settling-chamber. In the side of the funnel-body 10 is an opening covered by a screen or strainer 13.

A gravitating-flap 14, hinged at 15 to the funnel-bottom 11 and limited in its movements by a spring-catch 16, provides the means for covering the screened opening 13.

A cylindrical strainer 17, adapted to telescope within the funnel-body 10, has its lower end open, its upper end closed by a screen or strainer 18, and openings in its opposite sides covered by suitable strainers 19. The strainer-openings 19 are arranged to register, one at a time, with the screened opening 13 in the funnel-body. Handles 20 on the upper rim of the strainer enable it to be turned when desired to change from one to the other straining medium 19 in operative relation to the funnel-outlet 13 and also to lift the strainer out of the funnel when desired.

In use, the parts being in the positions shown in Fig. 2, the milk received in the funnel will pass through the upper screen 18 into the interior of the strainer 17 and the settling-chamber 12. The heavier particles of foreign matter will gravitate into and remain in the settling-chamber, while the lighter particles will be caught by the strainers 19 or 13 as the milk flows out of the funnel into the pail.

The normal position of the flap 14 being that shown in Fig. 2, when the pail is inverted, as indicated in Fig. 5, the flap will gravitate to position to close the opening 13, and thus prevent the milk from flowing out through that opening.

The device may be used as a ventilating-cover for a milk-can by inverting it and placing it on the can, as indicated in Fig. 4, the screened openings 13 and 19 permitting free passage of air.

The funnel being held in place on the pail by the hinged catches 21, it can readily be removed and replaced.

Having described my invention, what I claim, and desire to secure by Letters Patent, is—

1. The combination with a milk-pail, of a funnel-like attachment fitting in the mouth of the pail and provided with a settling-chamber in form of a hollow cone in its bottom and a screened opening in its side above the bottom, substantially as set forth.

2. An attachment adapted to fit in the mouth of a milk-pail and comprising an upper flaring portion, a middle cylindrical portion having a screened opening in its side, and a bottom providing a settling-chamber in form of a hollow cone, substantially as set forth.

3. An attachment adapted to fit in the mouth of a milk-pail and comprising an upper flaring portion, a middle cylindrical portion having a screened opening in its side, and a bottom providing a settling-chamber in form of a hollow cone, in combination with a removable strainer fitting in said cylindrical body and having an opening in its side and its top and said opening covered with screens, substantially as set forth.

4. The combination with an attachment adapted to fit in the mouth of a milk-pail and comprising an upper portion, a middle cylindrical portion having a screened opening in its side, and a bottom providing a settling-chamber in form of a hollow cone, of a rotatable strainer fitting in said cylindrical body and having a plurality of screened openings in its sides adapted to register successively with the screened opening in said cylindrical body, substantially as set forth.

5. The combination with a milk-pail having its top partially covered and a vertical flange around the opening, of a strainer attachment adapted to fit water-tight in said flange and comprising an upper flaring portion, cylindrical body portions, and a closed bottom providing a settling-chamber in form of a hollow cone, substantially as set forth.

In testimony whereof I have signed my name to this specification, in the presence of two subscribing witnesses, this 21st day of March, 1905.

CHARLES D. HIGGINS.

Witnesses:
P. H. GUNCKEL,
P. C. ROWLEY.